United States Patent [19]

Wakahara et al.

[11] Patent Number: 4,786,982
[45] Date of Patent: Nov. 22, 1988

[54] MULTI-FUNCTION ROTARY DIAL SYSTEM INCLUDING TIMER SETTING FEATURE

[75] Inventors: Tatsuya Wakahara, Tokyo; Shinya Fukushima, Saitama; Hisayuki Akiguchi, Tokyo; Toshizumi Ando, Kanagawa; Masanori Arimitsu; Kiyoshi Takagaki, both of Tokyo, Japan

[73] Assignee: Sony Corporation, Tokyo, Japan

[21] Appl. No.: 812,807

[22] Filed: Dec. 23, 1985

[30] Foreign Application Priority Data

Dec. 28, 1984 [JP] Japan .................. 59-275617
Dec. 28, 1984 [JP] Japan .................. 59-275623

[51] Int. Cl.⁴ .......................... H04N 5/783
[52] U.S. Cl. .................. 360/10.3; 360/33.1; 360/71; 360/73; 358/335
[58] Field of Search ............ 369/7, 6; 358/335, 191.1; 360/33.1, 10.1, 14.1, 61, 10.3, 71, 73; 455/181, 186, 185, 179; 361/340; 200/33 R, 61.58 R

[56] References Cited

U.S. PATENT DOCUMENTS

| | | | |
|---|---|---|---|
| 4,045,777 | 8/1977 | Mierzwinski et al. | 340/168 |
| 4,081,754 | 3/1978 | Jackson | 455/185 |
| 4,206,483 | 6/1980 | Nakamura | 360/33.1 |
| 4,270,117 | 5/1981 | Ziegelbeim | 455/185 |
| 4,325,081 | 4/1982 | Abe | 358/335 |
| 4,352,010 | 9/1982 | Koogler | 455/185 |
| 4,404,531 | 9/1983 | Genich | 455/185 |
| 4,428,005 | 1/1984 | Kubo | 360/10.3 |
| 4,527,204 | 7/1985 | Kozakai et al. | 360/33.1 |
| 4,538,188 | 8/1985 | Barker | 360/33.1 |
| 4,539,603 | 9/1985 | Takeuchi | 360/14.1 |
| 4,539,711 | 9/1985 | Harger | 455/166 |
| 4,549,173 | 10/1985 | Nakamura | 340/726 |

FOREIGN PATENT DOCUMENTS

| | | |
|---|---|---|
| 0002434 | 9/1978 | European Pat. Off. |
| 0109182 | 5/1984 | European Pat. Off. |
| 2491707 | 10/1981 | France |
| 2512571 | 9/1982 | France |
| WO8103713 | 12/1981 | PCT Int'l Appl. |

OTHER PUBLICATIONS

Patent Abstracts of Japan re: JP 57-85101.

*Primary Examiner*—Alan Faber
*Attorney, Agent, or Firm*—Ronald P. Kananen

[57] ABSTRACT

In a multi-function video tape recorder system, a manually operable rotary dial can be used in place of a large number of dedicated manual switches, and so forth to make selections from multiple-choice lists and to assign numerical values for timing, and so forth. The rotary dial is journalled on a fold-down section of the video tape recorder's front console and its manually-actuated rotation is monitored by optical sensors. A microprocessor receives the output of the sensors and so can derive the angular position and speed and direction of rotation of the rotary dial, which may all serve as input parameters. In addition, a ring may be included in the rotary dial assembly, the ring being pivotably slightly relative to the rotary dial itself to provide an addition dimension of information input. The rotary dial can be used to input date and time information for both clock setting and timer setting operations, to select a television channel for recording or direct reception, to select the speed and mode of video playback and/or to control the rate and direction of frame advance.

54 Claims, 8 Drawing Sheets

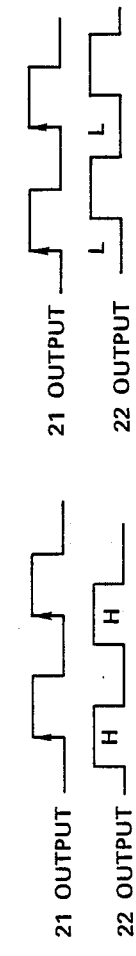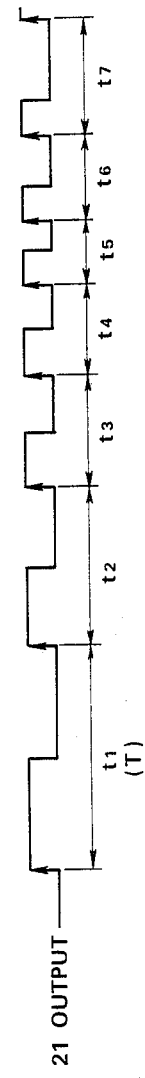

MULTI-FUNCTION ROTARY DIAL SYSTEM INCLUDING TIMER SETTING FEATURE

BACKGROUND OF THE INVENTION

The present invention relates generally to a multi-function rotary dial which can perform a variety of functions including timer setting. More specifically, the invention relates to a rotary dial which is applicable to video tape recorders (VTR) and so forth and designed to allow timer setting for timer-activated recording, and other functions.

Recent VTRs have various operational functions such as forward and/or reverse speed reproduction, still reproduction, variable speed reproduction, and timer-activated automatic recording, in addition to normal recording and reproducing functions. In order to allow manual operation or selection of the desired operation, VTRs are provided with a plurality of operation switches which are generally arranged on the front side of the VTR sets. These switch arrangements become more complicated as the number of functions built into the VTRs increases. This makes it difficult to arrange and operate the switches.

For manually setting the time, conventional VTRs are provided with a timer set key for entry into timer-set mode, an up key and a down key for advancing and retarding week, date and time values so as to select desired start and end times, a NEXT key for selecting the next item to be set, and a timer-record ON/OFF key. This conventional arrangement is not satisfactorily convenient for timer setting because of rather complicated manual operations required. In order to simplify the timer setting operation, some conventional VTR sets employs ten-key pads as a replacement for the up/down keys. Although these ten-key arrangements are convenient for setting timers, they tend to make the key-board arrangement more complicated and difficult to arrange.

SUMMARY OF THE INVENTION

In view of the drawbacks in the prior art, it is a principle object of the present invention to provide a rotary dial which simplifies the arrangement of the switches on the front side of the VTR set and simplifies manual operation thereof for timer setting.

Another object of the invention is to provide a rotary dial which allows not only timer setting but also other functions, such as manual playback, setting of variable playback speed and so forth.

In order to accomplish the above-mentioned and other objects, a rotary dial, according to the invention, is provided with an angle sensor capable of detecting angular variation of the rotary dial and producing a rotary dial angle signal having a value representative of the angular position of the rotary dial. The angle sensor is associated with a timer for advancing and retarding set week, date and time values.

In order to allow the rotary dial to perform a variety of functions, the rotary dial is associated with one or more mode selector switches allowing selection of desired functions, such as manual playback in which playback speed can be proportional to revolution speed of the rotary dial, or playback speed setting.

Preferably, the rotary dial is also associated with a revolution speed sensor which produces a rotary dial speed signal having a value varying in accordance with the revolution speed of the rotary dial. The timer is responsive to the rotary dial speed signal to adjust the advance and retard rate of the week, date and time value and so allow the desired recording of week, day, and start and end times to be set conveniently.

According to one aspect of the invention, a rotary dial assembly for a VTR system capable of recording and reproducing VTR signals, performing picture search, and performing timer activated recording, comprises a dial manually rotatable at a desired speed in opposing first and second directions, a first sensing means for monitoring magnitude of angular displacement of the dial and producing a rotation angle indicative signal, a timer set mode switch manually operable to produce a timer set mode selector signal ordering the VTR system to operate in a timer set mode, a display for displaying at least symbols representing a timer-activated recording start timing and end timing, and a controller responsive to the time set mode selector signal for changing the value represented by each of the symbols at a given rate on the display, the given rate being selected on the basis of the values of the direction indicative signal and the rotating angle indicative signal.

The rotary dial assembly further comprises a second sensing means for monitoring the rotation speed of the dial and producing a rotation speed indicative signal, and the controller is responsive to the rotation speed indicative signal to adjust the given rate based thereon.

On the other hand, the rotary dial assembly futher comprises means for triggering a picture search mode and producing a command for entry into the picture search mode, and the controller is responsive to the comman to perform forward and reverse playback selectively and at a given speed according to rotation of the dial. The VTR system includes a pause switch for temporarily stopping playback so as to freeze an image on a TV monitor, the pause switch serving as the picture search triggering means.

The rotary dial assembly further comprises means for triggering a picture search mode and producing a command for entry into the picture search mode, a ring rotatable independently of the dial and a fourth sensing means monitoring the angular position of the ring and producing a shuttle mode selector signal when angular displacement of the ring is detected, and the controller is responsive to the shuttle mode selector signal in the presence of the command for selectively performing forward and reverse playback at a variable playback speed varying in accordance with the direction and magnitude of angular displacement of the ring. The first and first sensing means also cooperate with the ring for monitoring angular displacement of the latter and producing the rotating direction indicative signal and the rotation angle indicative signal. The controller is also responsive to rotation of the dial in the presence of the command for performing forward and reverse playback selectively at a given speed according to rotation of the dial.

The VTR system also has a TV tuner for selecting a TV channel and in which the selected TV channel is indicated on the display, further comprising means for triggering a channel set mode for the VTR system for selecting a TV channel, and the controller is responsive to rotation of the dial in the channel set mode to adjust the channel selection according to angular displacement of the dial. The controller adjusts the rate of change of the TV channel in the channel set mode depending upon the rotation speed indicative signal value.

In the preferred construction, the rotary dial assembly is mounted on a sub-panel associated with a front panel of the VTR system, the sub-panel being hinged to the front panel for movement between a first position in which the sub-panel is oriented vertically so as to expose one side of the rotary dial assembly for manual operation and a second position in which the sub-panel is oriented horizontally so as to expose the other side of the rotary dial for manual operation. The first mode selector switch is disposed on the portion of the front panel opposing the sub-panel when the latter is in its vertical position, hidden thereby and accessible only when the sub-panel is in the horizontal position. The dial and the ring are associated with a common rotary plate with which the first, second and third sensing means are associated for monitoring the direction, magnitude and speed of angular displacement thereof. The dial is further associated with a click mechanism providing a detent action at every given angle of angular diaplacement, which given angle corresponds to one frame of a video signal.

According to another aspect of the invention, a VTR system comprises a signal processing system for processing VTR signals for recording and reproducing, which signal processing system is associated with a timer for timer-activated recording, the timer being actuatable to select a recording start timing, recording end timing and a TV channel to be recorded, and a manually rotatable rotary dial system associated with the timer to allow selection of the recording start timing, recording end timing and TV channel by rotation thereof.

The signal processing system also allows a picture in a playback-pause search state for locating a desired image frame, and advances the image frame forward and reverse at a given speed according to rotation of the rotary dial system. The VTR system further comprises a ring associated with the signal processing system and rotatingly operable to perform a picture search at a predetermined variable speed according to the direction and magnitude of its rotation. The ring is connected to the manually operable rotary dial system to form an assembly and is operable independently of the manually operable rotary dial system. The assembly is mounted on a sub-panel hinged to a front panel of the VTR system, the sub-panel having two surfaces at which at least the rotary dial is accessible.

In accordance with a further aspect of the invention, a method of inputting information from a user to the VTR system with a rotary dial input device, comprises the steps of:
manually rotating the rotary dial at a rate, to an extent and/or in a direction indicative of the desired information;
monitoring rotation of the rotary dial; and
converting the direction, speed and/or extent of rotation of the rotary dial into an information form readily employable by the VTR system.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 14 and 15 show the relationships between ouptputs of optical sensors for indicating the direction of rotation of a rotary dial in the preferred embodiment of the rotary dial assembly;

FIG. 16 is a diagram of the variation of the pulse duration according to rotation speed of the rotary dial;

DESCRIPTION OF THE PREFERRED EMBODIMENT

Figure 1:
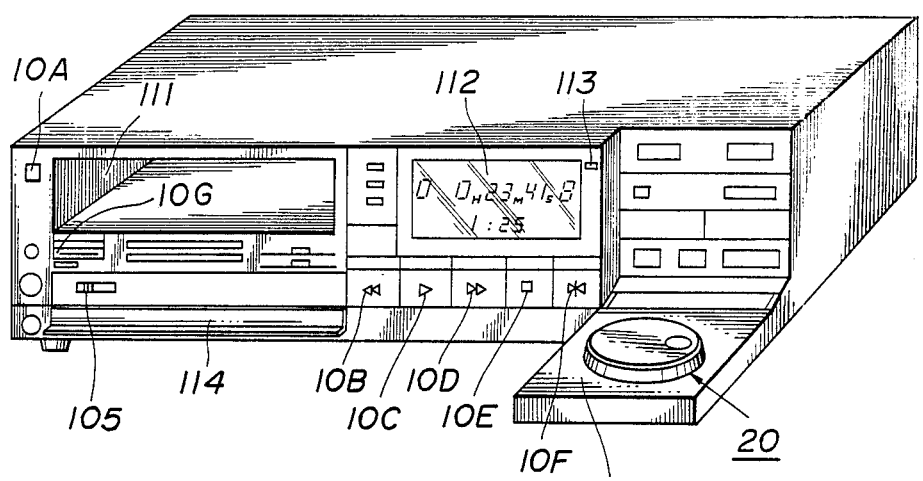
FIG. 1 is a perspective view of a VTR deck in which the preferred embodiment of a rotary dial according to the present invention is installed.

Referring now the the drawings, particularly to FIGS. 1 to 5, the preferred embodiment of a rotary dial 200 is installed in a VTR deck 100. The VTR 100 has a front panel 110 with an opening 111 through which a VTR tape cassette is inserted, which opening will be hereafter referred to as a "cassette insert". The cassette insert 111 establishes communication between the exterior of the deck and a cassette compartment within the deck and is normally closed by a lid 111a. Near the cassette insert 111, an eject button $10_G$ is provided. The eject button $10_G$ is associated with a cassette eject mechanism (not shown) in a per se well-known manner.

On the front panel 110, a power switch button $10_A$, mode selector buttons, e.g. a rewinding button $10_B$, a playback button $10_C$, a fast-forward button $10_D$, a stop button $10_E$ and a pause button $10_F$ are provided. Such mode selector buttons are associated with a VTR system housed in the deck 100 in a per se well-known manner. A display 112 on the front panel 110 lies side-by-side with the cassette insert 111. The display 112 serves as a clock for displaying the time, and as a real-time counter for displaying recording time and/or playback time. The display 112 may also serve as a mode indicator for indicating the current operation mode of the VTR system, or as a channel indicator for a TV tuner which is incorporated with the VTR system in a per se well-know manner. The display 112 may also serve as a timer-activated recording indicator which turns on when timer-activated recording is ordered.

Although not clearly shown in the drawings, the front panel 110 also has a record button for selecting a recording mode. An input selector 105 (shown in FIG. 4) is also provided on the front panel 110 below the cassette insert 111. The input selector 105 is normally hidden by means of a lid 114. The input selector 105 switches the video signal source between a TV tuner and others, such as other VTR systems, a PCM signal reproducing apparatus and so forth.

Figure 2:
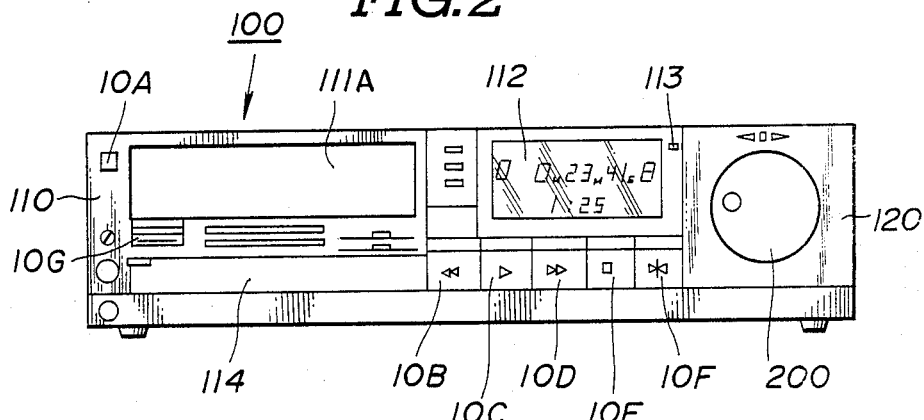
FIG. 2 is a front elevation of the VTR deck of FIG. 1.
Figures 3, 4:
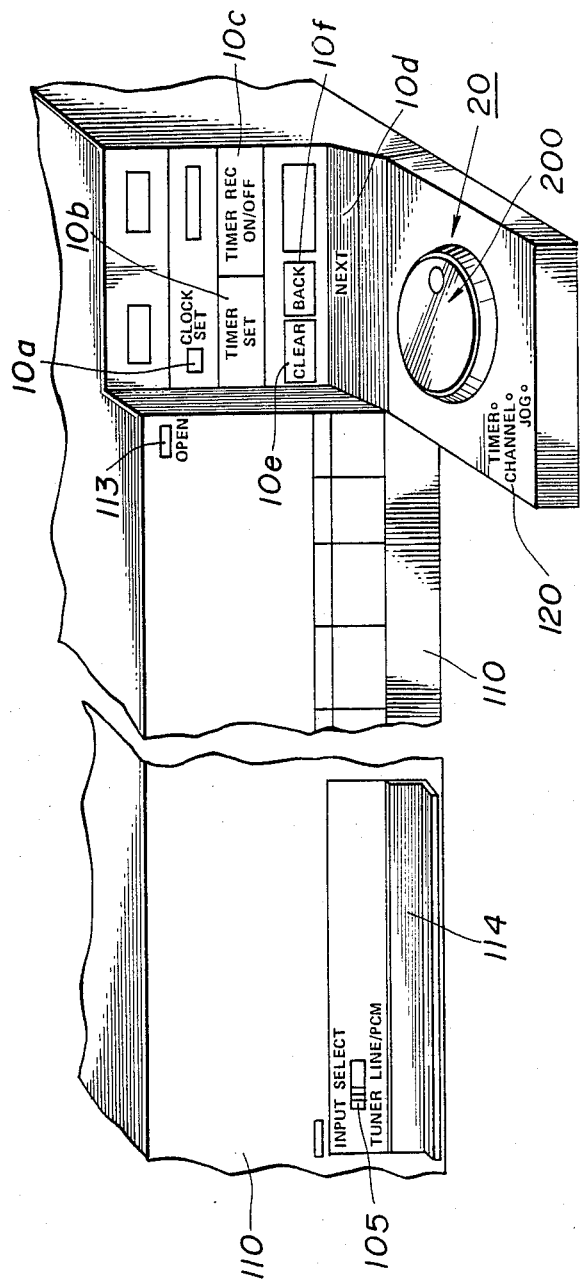
FIG. 3 is an enlarged partial perspective view of the major part of the VTR deck of FIG. 1.
FIG. 4 is an enlarged partial perspective view of another major part of the VTR deck of FIG. 1.

A rotary dial assembly 20 is mounted on a sub-panel 120 installed on the front panel 110 to the side of the display 112 opposite the cassette insert 111. The rotary dial assembly 20 is designed to allow timer setting, manual scanning and playback speed selection in the shown embodiment. Also, the rotary dial assembly may serve as a TV-channel selector while the TV turner in the VTR system is active. The sub-panel 120 is pivotably connected to the front panel 110 at its lower edge and movable between a vertical position at which the front surface of the sub-panel 120 lies flush with the front surface of the front panel as shown in FIG. 2, and a horizontal position at which the sub-panel 120 extends horizontally from the front panel 110 as shown in FIGS. 1 and 3. The sub-panel 120 is normally in the vertical position and locked by means of an appropriate locking mechanism. In order to unlock the lockig mechanism and allow the sub-panel to move to the horizontal position, a push button 113 is provided on the front panel 110, which push button is located adjacent the sub-panel 120 and will be referred to hereafter as a "sub-panel open button". Timer set operation buttons are disposed on the portion of the front panel 110 normally concealed by the sub-panel 120. The timer set operation buttons consist of a clock set button 10a, a timer set mode selector button 10b, a timer recording ON/OFF button 10c, a next item selector button 10d, a clear button 10e and an item-back button 10f. The functions of these timer set operation buttons will be described in detail below.

As will be apparent from FIGS. 1 to 5, a rotary dial 200 is accessible in both of the vertical and horizontal positions of the sub-panel 120. The rotary dial assembly 20 also has a shuttle ring 220. At the vertical position, when the rotary dial 200 is rotated in a pause mode, it allows the user to step to forward and backwards through the tape at a speed proportional to the rotation speed of the rotary dial, which action will be hereafter referred to as "manual scan". At the horizontal position, the rotary dial 200 can be rotated to adjust the timer setting for timer-activated recording and the shuttle ring can be rotated in the pause mode to allow playback of the tape at a variable speed. In the preferred embodiment, the playback speed, when played back upon the control of the shuttle ring, is variable among one-fifth, normal- and double-speeds.

Figure 6:
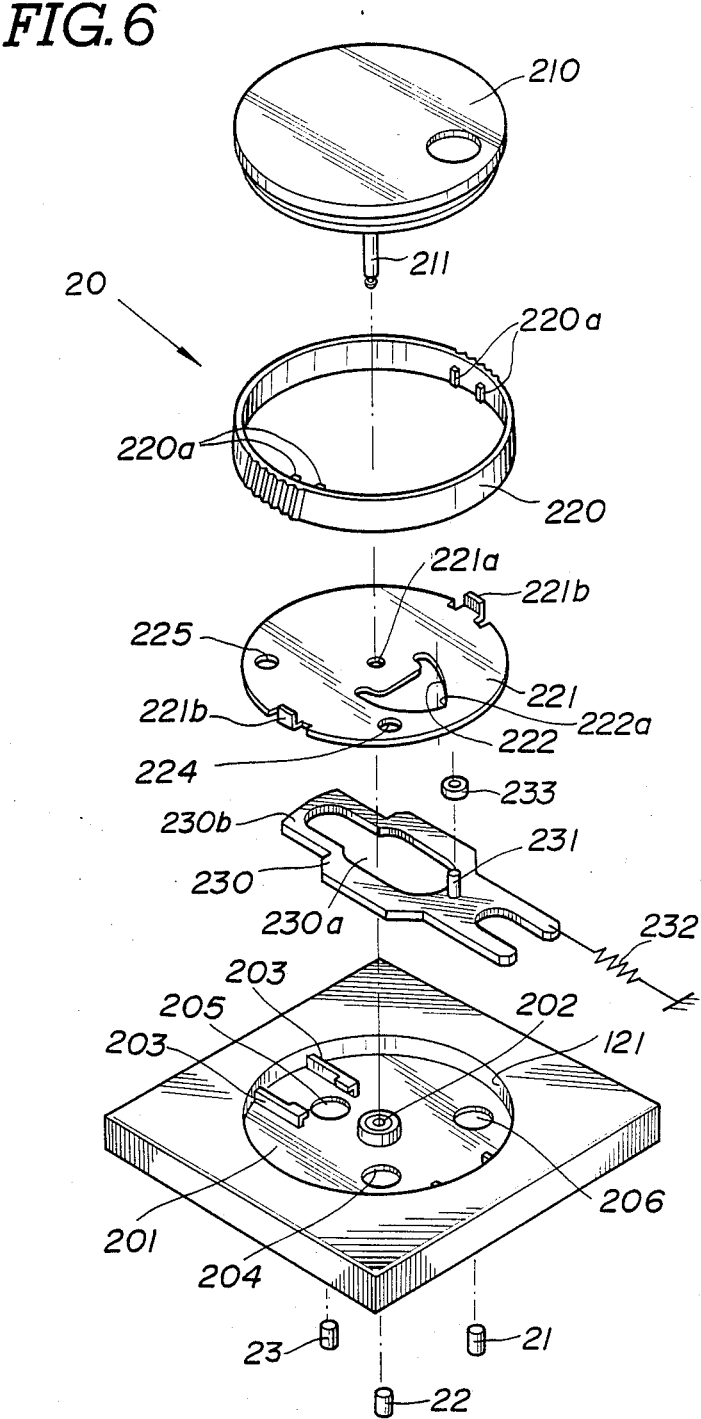
FIG. 6 is an enlarged and exploded perspective view of the preferred embodiment of a rotary dial assembly according to the present invention.
Figure 7:
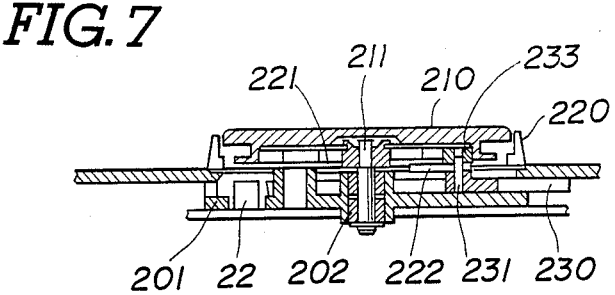
FIG. 7 is a cross-section through the assembled rotary dial assembly.

As shown in FIGS. 6 and 7, the rotary dial assembly 20 is rotatably mounted on a base 201 which is formed integrally with the sub-panel 120. The base 201 defines a rest 121 for receiving a dial disc 210 and other equipment forming part of the rotary dial 200 and the shuttle ring 220. The base 201 is circular in plan view and has a central bearing boss 202 which rotatably receives a rotary shaft 211 formed on the dial disc 210. The rotary shaft 211 is fixed to the dial disc 210 for rotation therewith and extends through a central opening 221a formed through a rotary disc 221. The rotary disc 221 is rotatable about the rotary shaft 211 and has a generally heart-shaped cam hole 222. The cam hole 222 receives an actuation pin 231 extending from a slide lever 230. The slide lever 230 has an elongated hole 230a through which the rotary shaft 211 passes. The elongated hole 230a extends along the longitudial axis of the slide lever 230 and has a transverse width greater than the diameter of the bearing boss 202 so as to allow sliding movement across the base 201.

The base 201 has three holes 204, 205 and 206 for receiving optical sensors 21, 22 and 23 respectively. The optical sensors 21, 22 and 23 monitor angular displacement of the rotary dial 200 and the shuttle ring, the operation of which will be described later.

The slide lever 230 has a section 230b slidably engaging a pair of guides 203 formed on the base 201. The guide 203 of the base 201 serves as a retainer for the slide lever 230 and guides movement of the slide lever 230 along its own longitudinal axis. The slide lever 230 is biased in a direction $F_o$ by means of a bias spring 232. The biasing force $F_o$ exerted by the slide level 230 urges the pin 231 into the section 222a of the cam hole 222.

The rotary disc 221 has a pair of vertical tabs 221b extending vertically from its periphery. The shuttle ring 220 has pairs of extensions 220a engaging the strips 221b for rotation with the rotary disc 221.

Figure 8:
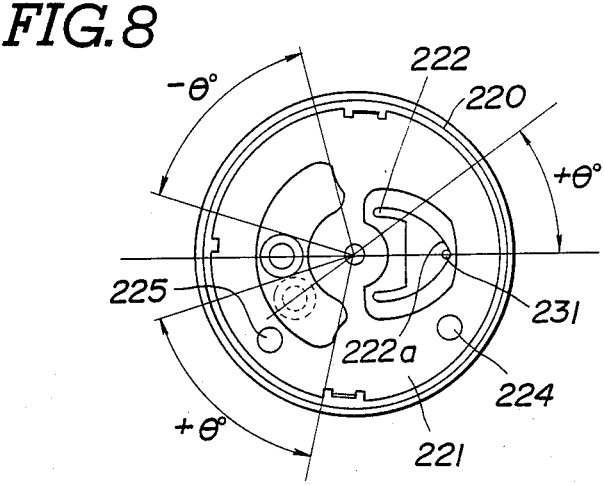
FIG. 8 is a diagram of the interaction between a shuttle ring in the rotary dial assembly and a rotary disc.
Figure 9:
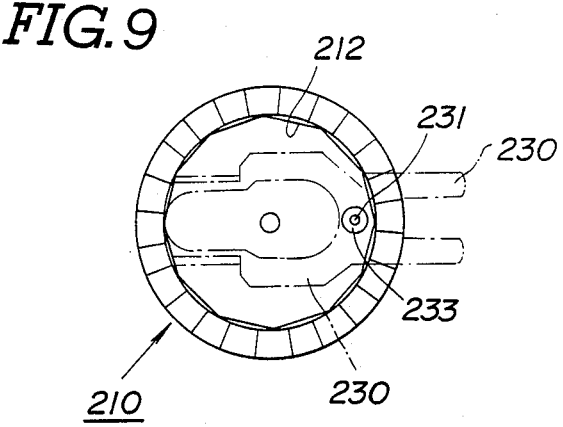
FIG. 9 is a diagram of a click mechanism of the rotary dial assembly of FIG. 6.

The slide lever 230 cooperates with the shuttle ring 220 in such a manner that after the shuttle ring 220 is rotated through an angle $+\theta_1$ as shown in FIG. 8, the pin 231 is positioned in the cam hole 222 as shown by the phantom lines. At this position, component F' of the rotational torque applied to the shuttle ring 220 balances the spring force $F_0$ of the bias spring 232. Upon releasing the rotational torque applied to the shuttle ring, the pin 231 is returned to the section 222a of the cam hole 222 by the spring force of the bias spring 232. Accordingly, the rotary disc 221 is rotated through the corresponding angle $+\theta_1$ and returned to the predetermined initial angular position in response to release of the rotational torque on the shuttle ring.

The rotary disc 221 is formed with through openings 224 and 225 which are located so as to be aligned with the holes 204 and 205 of the base 205 when the rotary disc is in the initial angular position.

The dial disc 210 has an annular extension 212 extending from its periphery toward the base. The inner periphery 212a of the annular extension 212 is polygonal, e.g. a dodecagon. The inner periphery 212a acts as a cam surface along which a cam roller 233 mounted on the pin 231 tracks. The cam roller 233 is resiliently biased toward the cam surface 212a by the spring force of the bias spring 232. This resilient contact between the cam roller 233 and the cam surface 212a serves to providing a detent action for dial disc 210 rotation.

Figure 10:
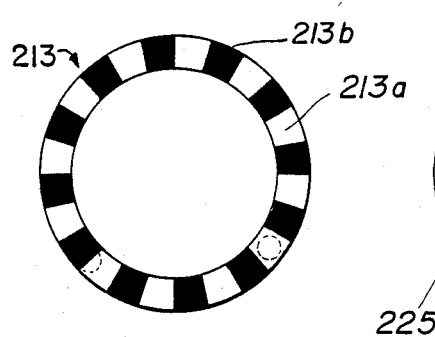
FIG. 10 is a plan view of a reflector plate which is composed of a plurality of reflecting segments and a plurality of non-reflecting segments arranged alternatingly.

The dial disc 210 also has a surface opposing the optical sensors 21, 22 and 23, to which an annular reflector sheet or plate 213 adheres. The surface of the reflector plate 213 opposing the optical sensors 21, 22 and 23 consists of a plurality of reflecting segments 213a and a plurality of non-reflecting segments 213b, as shown in FIG. 10. The reflecting segments 213a and the non-reflecting segments 213b alternate along the periphery of the reflector plate 213. In the preferred embodiment, the reflecting and non-reflecting segments 213a and 213b are of identical shape and each covers 1/24 of the circumference of the reflector plate 213.

Figure 11:
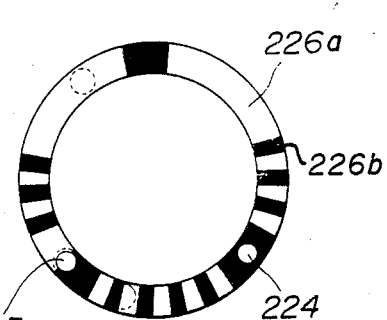
FIG. 11 is a plan view of another reflector plate which is composed of a plurality of reflecting segments and a plurality of non-reflecting segments arranged alternatingly.

Similarly, the rotary disc 221 has a surface opposing the optical sensors 21, 22 and 23 to which an annular reflector sheet or plate 226 adheres. The surface of the reflector plate 226 opposing the optical sensors 21, 22 and 23 consists with a plurality of reflecting segments 226a and a plurality of non-reflecting segments 226b, as shown in FIG. 11. The reflecting segments 213a and the non-reflecting segments 226b alternate along the periphery of the reflector plate 226.

Each of the optical sensors 21, 22 and 23 comprises a photo-interrupter having a light-emitting diode and a photo-transistor. The optical sensors 21 and 22 monitor angular variation of the dial disc 210 and produce first and second sensor signals which have signal phases offset from one another by 90°. The optical sensor 23 monitors angular variation of the rotary disc 221 and thus monitors angular variation of the shuttle ring 220.

Figure 12:
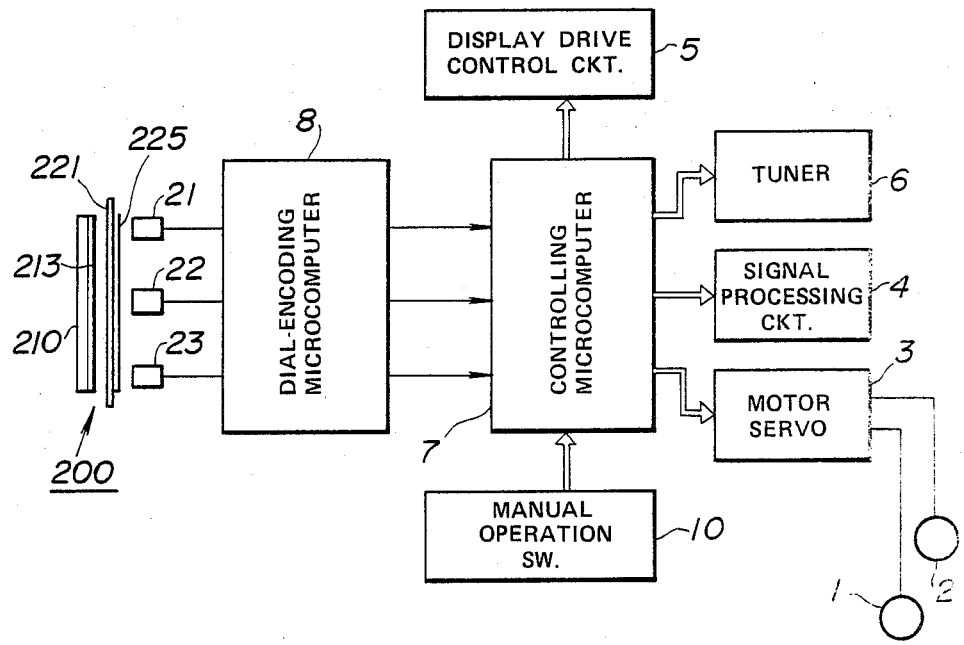
FIG. 12 is a block diagram of the preferred embodiment of a control system associated with the preferred embodiment of the rotary dial assembly according to the invention.

As shown in FIG. 12, the optical sensors 21, 22 and 23 are connected to a dial-encoding microprocessor 8. The dial-encoding microprocessor 8 is associated with a controlling microprocessor 7. The controlling microprocessor 7 is connnected to a display drive control circuit 5, a tuner circuit 6, a signal processing circuit 4 and a motor servo circuit 3 which is, in turn, connected to a reel motor 1 and a capstan motor 2. The controlling microprocessor 7 is also connected to the manual operation switches 10, such as the power switch $10_A$, the mode selector switch $10_B$, the playback button switch $10_C$, the fast-forward button switch $10_D$, the stop button switch $10_E$, the pause button switch $10_F$, the clock set button switch $10_a$, the timer set mode selector switch $10_b$, the timer recording ON/OFF button switch $10_c$, the next item selector $10_d$, the clear button switch $10_e$ and the item-back button switch $10_f$.

It should be appreciated that, although the shown embodiment employs the dial-encoding microprocessor for applying the outputs from the optical sensors 21, 22 and 23 to the controlling controller, it would be possible to employ a waveform-shaping circuit or circuits for producing rectangular wave pulses based on the optical sensor outputs as a replacement for the dial-encoding microprocessor.

The controlling microprocessor 7 controls the signal processing circuit 4 which processes video signals and audio signals in a per se known manner in accordance with the desired recording and reproducing mode selected by means of the manual operation switches 10. The controlling microprocessor 7 also controls the tuner circuit 6 which selects a TV channel in a per se well-known manner for recording of the desired TV program or for sending video and audio signals to a TV monitor for direct reproduction. The motor servo circuit 3 is controlled by the controlling microprocessor 7 to drive the reel motor 1, the capstan motor 2 and so forth. Although it is not clearly illustrated in the drawings, the motor servo control circuit 3 may also control a servo system for a VTR cassette loading system, ejection system and a rotary head drive.

The display drive control circuit 5 is also connected to the controlling microprocessor 7 for controlling the display 112. As shown in detail in FIG. 5, the display 112 includes a column 112a serving as the real-time counter, a column 112b serving as the clock counter, columns 112c and 112d for calender displays, a column 112e for designation of the week or weeks in which to perform timer-activated recording, which may display "THIS WEEK", "NEXT WEEK", or "AFTER NEXT" in the case of a VTR recorder which allows timer-activated recording over a three-week period, a column 112f for indicating designation of timer-activated recording "EVERY WEEK"0 at a set time and day of the week and at a designated TV channel, a column 112g for indication of the selected TV channel, a column 112h for indication of stereo reproduction, and a column 112i for indication of index scan. The columns 112b and 112d are associated with each other to display day of the week and clock time during all normal operations of the VTR system except for TIMER SET MODE. The display 112 may also include a column 112j for indication of the recording tape type, e.g. $\beta$I, $\beta$II, $\beta$III as indicated in phantom line in FIG. 5. Also, the display 112 may have a column 112k for indicating a presence or absence of a VTR tape cassette as illustrated in phantom line in FIG. 5. In a TIMER SET MODE, the column 112a accompanies the column 112c and serves as an indicator for the start time of the timer-activated recording. Similarly, the column 112b cooperates with the column 112d and serves as an indicator for the recording end time when setting the timer.

Figure 13:
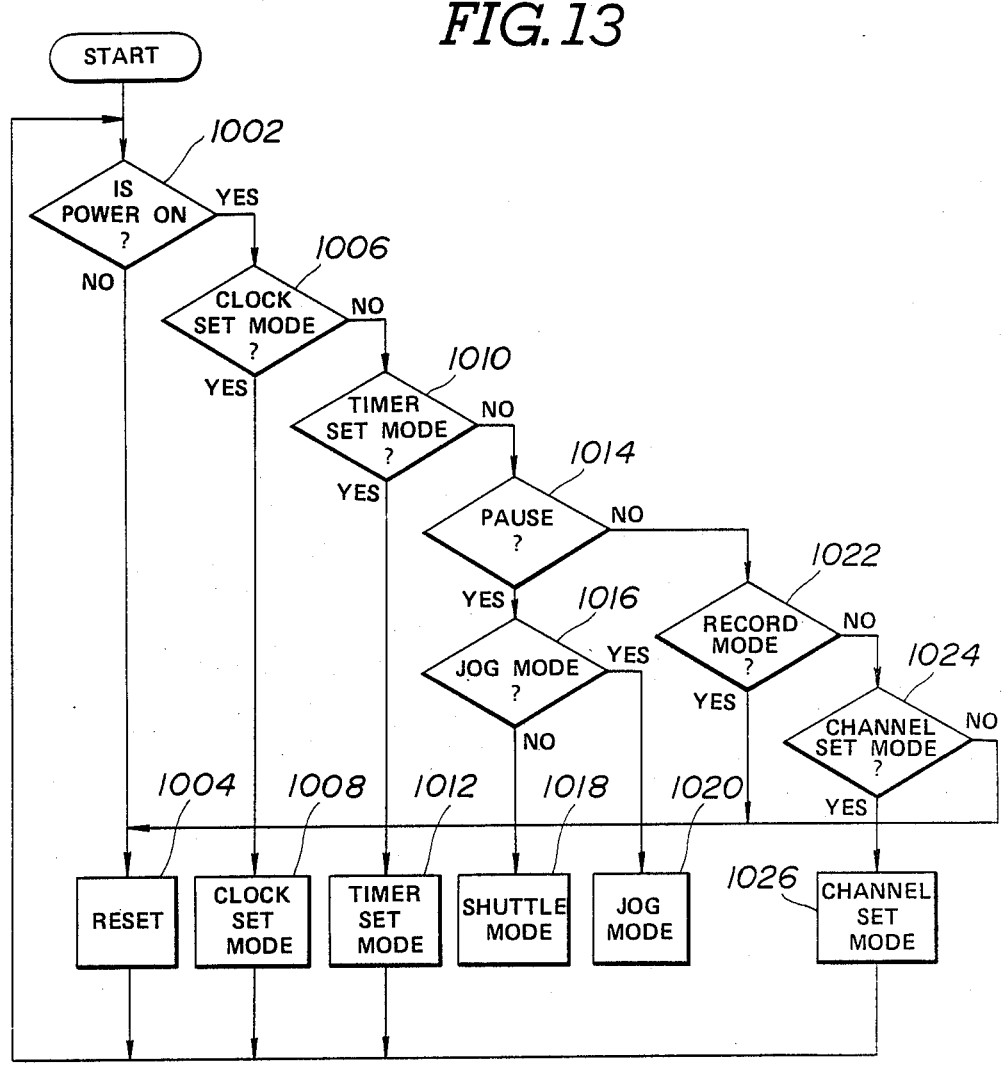
FIG. 13 is a flowchart of a input control program to be executed by the preferred embodiment of the rotary dial assembly.

As set out above, the rotary dial assembly performs three functions, i.e. timer setting, manual scanning, and adjustment of playback speed. In addition, the rotary dial assembly allows TV channel selectio while the TV tuner in the VTR system is active. In order to selectively perform the desired mode of operation, the program shown in FIG. 13 is executed by the controlling microcomputer 7. As will be appreciated from FIG. 13, the shown control program is executed cyclically at a given timing even while the main power switch of the VTR unit is OFF.

First, at a step 1002, the main power switch is checked to see whether or not it is in the ON position. If the main power switch is OFF, the controlling microcomputer 7 is reset at a step 1004 and then control returns to the step 1002.

On the other hand, if the main switch is ON when checked at the step 1002, then the clock set switch $10_a$ is checked at a step 1006. If the clock set switch $10_a$ has been set to the ON position, the microcomputer allows setting the clock according to rotational manipulation of the rotary dial 20. In other words, at a step 1008, CLOCK SET MODE is performed. On the other hand, if the clock set switch $10_a$ is OFF, then the timer set switch $10_b$ is checked at a step 1010. If the timer set switch $10_b$ has been set to the ON position, the microcomputer allows the timer to be set according to rotational manipulation of the rotary dial 20. In other words, at a step 1012, TIMER SET MODE is performed. On the other hand, if the timer set switch $10_b$ is OFF, then the playback button switch $10_A$ and the pause button switch $10_C$ are checked at a step 1014. If both of the playback button switch $10_A$ and the pause button switch $10_C$ are ON, which means that the VTR unit is in playback-pause position, then the output of the optical sensor 23 is checked at a step 1016 to see whether or not the shuttle ring 220 is being rotated. If so, the process goes to a step 1018 to perform SHUTTLE MODE. Otherwise, the process goes to a step 1020 to perform JOG MODE.

On the other hand, if the playback-pause position is not detected when checked at the step 1016, then the record button switch (not shown) is checked at a step 1022. If the record button switch is ON and thus the RECORD MODE operation of the VTR unit is detected, the microcomputer is reset at the step 1004 and control returns to the step 1002. Otherwise, the input selector switch 105 is checked at a step 1024. If the TV tuner has been selected by means of the input selector switch 105, then CHANNEL SET MODE is performed at a step 1026. If the input selector switch 105 is in its LINE/PCM MODE position, then control passes to the step 1004.

Hereafter, the operation of the rotary dial assembly 20 in CLOCK SET MODE, TIMER SET MODE, SHUTTLE MODE, JOG MODE and CHANNEL SET MODE will be described.

CLOCK SET MODE OPERATION (Step 1008)

Figure 5:
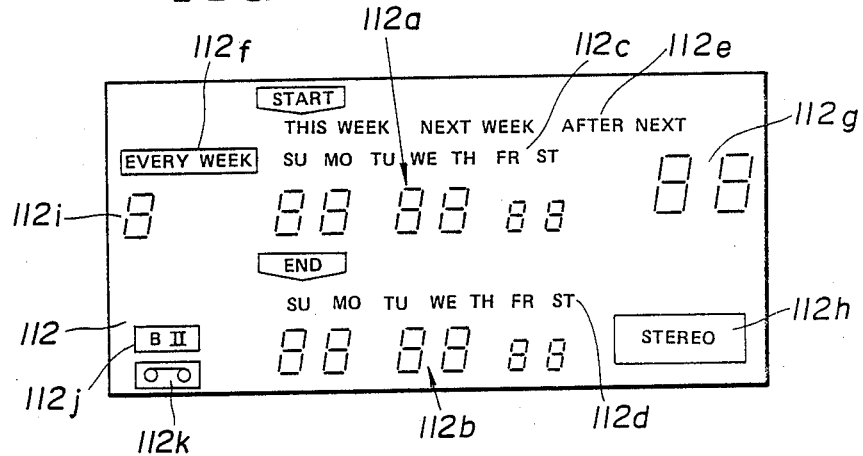
FIG. 5 is an enlarged front elevation of a display on the front panel of the VTR deck of FIG. 1.
Figure 17:
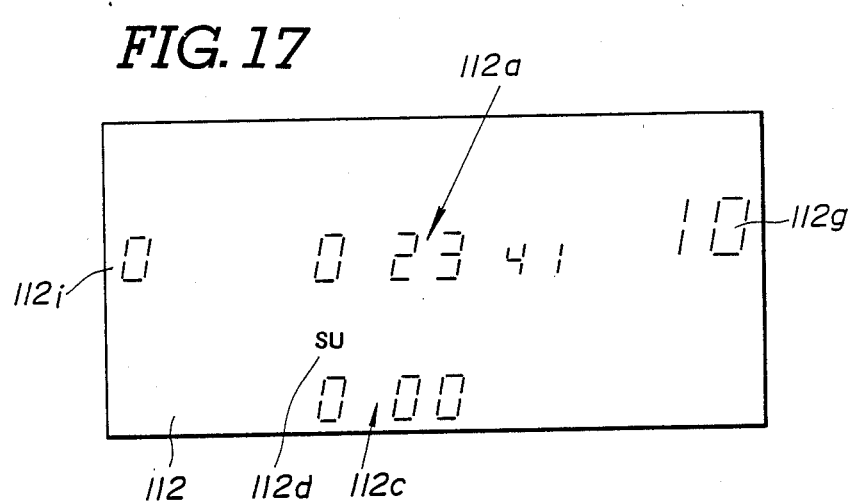
FIG. 17 shows the display when serving as a tape indicator, a TV-channel indicator, and a clock indicator.

As shown in FIGS. 5 and 17, the clock time is displayed in the columns 112b and 112d. When it becomes necessary to set the clock, the power cord is first plugged into a wall outlet, whereupon a predetermined clock time, e.g., "SU" and "AM 12:00" which means 12:00 AM Sunday, is displayed on the display 112. In order to correct the clock to the current clock time, the push button 113 is depressed to move the rotary dial assembly 20 to its horizotnal position and then the clock set switch 10a is depressed to enter CLOCK SET MODE.

After depressing the clock set switch 10a, first, the week indicator in the column 112d starts blinking. The dial disc 210 can then be manually rotated to select the day of the week. In this case, when the dial disc 210 is rotated clockwise, a weekday indicator is advanced; for example, the SU symbol may stop blinking while the MO (Monday) symbol starts blinking. On the other hand, when the dial disc 210 is rotated counterclockwise, the direction of advance is reversed. After the correct day of the week is selected, the next item selector button 10d is depressed. Then, the day indicator stops blinking and the hour indicator in the column 112b starts to blink. The dial disc 210 can again be rotated either clockwise or counterclockwise to adjust the currently selected hour symbol together with an indication of AM/PM. After the correct hour and correct AM/PM has been selected, the next item button 10d is again depressed. As a result, the hour indicator stops blinking and the minutes indicator in the column 112b starts blinking. The dial disc 210 can then be rotated clockwise or counterclockwise to select the minutes symbol which correctly indicates the current time. By depressing the next item selector button 10d again, the CLOCK SET MODE ends and then the set clock time is indicated on the columns 112b and 112d of the display 112.

Also as set out above, since the output phases of the optical sensors 21 and 22 differ by 90°, the direction of rotation of the dial disc 210 can be sensed by checking the signal phase of the optical sensor 22 at the leading edge of each HIGH-level output from the optical sensor 21. In the preferred embodiment, the optical sensors 21 and 22 are arranged in such a manner that, when the dial disc 210 is rotated clockwise, the signal phase of the output of the optical sensor 22 will be HIGH at the leading edge of a HIGH-level pulse from the optical sensor 21, as shown in FIG. 14, and when the dial disc 210 is rotated counterclockwise, the signal level of the output of the optical sensor 22 will be LOW at the leading edge of HIGH-level pulses from the optical sensor 21, as shown in FIG. 15. Therefore, the controlling microcomputer 7 distinguishes between directions of rotation of the dial disc 210 by detecting the signal phase of the optical sensor 22 at the timing of rising of the output of the optical sensor 21. The controlling microcomputer 7 also derives rotation speed of the dial disc according to the pulsewidths, e.g. $t_1$, $t_2$, $t_3$, $t_4$, $t_5$, $t_6$ and $t_7$ in FIG. 16. The controlling microcomputer 7 compares the derived rotation speed of the dial disc 210 with a predetermined threshold and appropriately adjusts the rate of change of the numbers on the display 112. For example, in order to adjust the minutes value of the clock time, when the dial disc 210 is rotated at a relatively low speed, the minutes value will change by "1" with every given angle of dial rotation, and, on the other hand, when the dial disc 210 is rotated at a relatively high speed, the minutes value will change by more than "1", e.g. by "2" with every given angle of dial rotation. This reduces the required angular change needed to reach the desired number. This would be convenient when a relatively large adjustment is required. In addition, since the rate of change can be adjusted automatically according to the rotation speed of the dial disc 210, it allows fine adjustment of the number by slowing down the rotation speed after coarse adjustment by way of high-speed rotation of the dial disc.

TIMER SET MODE (Step 1012)

As is well known, the TIMER SET MODE is performed in order to set up timer-activated recording, i.e. to set the record start time, record end time, day of the week, TV channel to record and so forth. To set the timer, first, the push button 113 is depressed as for clock setting, to move the rotary dial assembly 20 to its horizontal position. Thereafter, the timer set button 10b is depressed to enter the TIMER SET MODE.

It should be appreciated that, in the TIMER SET MODE operation, the columns 112a and 112c of the display serve as a record start time indicator and the columns 112b and 112d serve as a record end time indicator.

Figure 18:
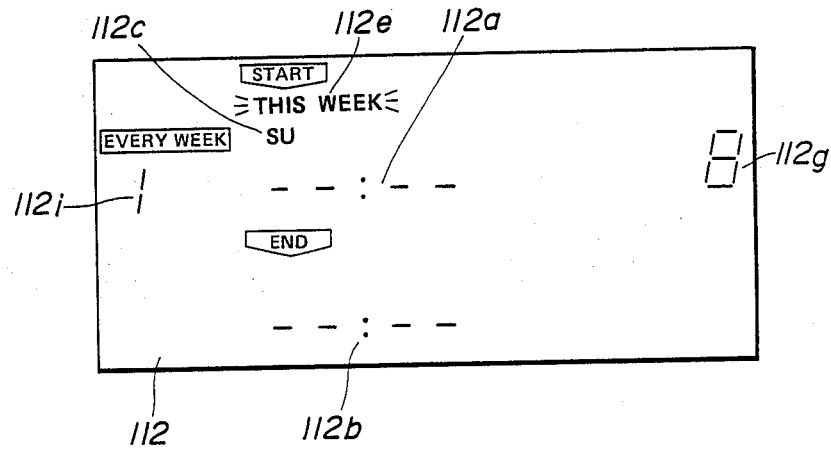
FIG. 18 shows the display in a TIMER SET MODE.

After depressing the timer set button, the controlling microcomputer 7 enters the TIMER SET MODE. In response to this, the column 112e indicative of the desired week at which the timer-activated recording is ordered starts blinking as shown in FIG. 18. Specifically, one of the symbols "THIS WEEK", "NEXT WEEK", "AFTER NEXT" and "EVERY WEEK" will be blinking. The blinking symbol is advanced forward or backward according to rotation of the dial disc 210. After selecting the desired week, the next item selector button 10d is depressed. Then, the column 112c indicating the day of the week starts blinking as in the CLOCK SET MODE. The day of the week and the record start time can be selected in substantially the same manner as when setting the clock as explained above.

After setting the record start time, in response to depression of the next item selector button 10d, the hour symbol in the column 112b starts blinking. As in the CLOCK SET MODE, the hour symbol and minutes symbol in the column 112b may be selected to set the record end time. Upon depressing the next item selector button 10d after setting the minutes value in column 112b, a TV channel symbol in column 112g starts blinking. By rotating the dial disc 210, the number displayed in the column 112g is advanced or retarded according to the direction and magnitude of rotation of the dial disc 210. As described previously, the rate of change of the number is adjusted depending upon the rotation speed of the dial disc. When the number of the desired TV channel is obtained on the column 112g, the next item selector button 10d is depressed. Then, TIMER SET MODE ends.

In order to perform timer-activated recording, the timer recording ON/OFF button switch 10c is depressed subsequent to selection of the record start time, record end time and TV channel to be recorded in TIMER SET MODE. The controlling microcomputer 7 then enters timer-activated recording mode. In VTR systems now on the market, upon entry into the timer-activated recording mode, the main power switch is automatically turned OFF and the VTR system will not accept entry of inputs through manual switches except for the timer recording ON/OFF switch 10c and another switch (not shown) used to confirm the timer setting. The timer record ON/OFF switch 10c then serves as a cancel switch allowing the user to cancel timer-activated recording.

SHUTTLE MODE
(Step 1018)

SHUTTLE MODE can be performed in the playback-pause position to cause the VTR tape to be played back at one-fifth of normal speed, normal speed or at double-speed. In the playback-pause position, the picture on the TV monitor is frozen. By grasping and rotating the shuttle ring 220 under these conditions, a picture search or scanning can be performed at a variable speed depending upon the angular offset of the shuttle ring. Also according to the direction of rotation of the shuttle ring 220, a forward scan and a reverse scan can be performed selectively. According to the preferred embodiment, by rotating or turning the shuttle ring 220 clockwise, the forward scan can be performed. On the other hand, by turning the shuttle ring 220 counterclockwise, the reverse scan can be performed.

The shuttle ring 220 can be turned or rotated clockwise and counterclockwise through respective given angles. According to the angular position of the rotary disc 221 rotated according to rotation of the shuttle ring 220, a forward and a reverse variable-speed picture search can be performed as set forth above. Also, relatively high-speed scanning (which is referred to as CUE REV) can be performed by rotating the shuttle ring 220 to its limit.

Figure 19:
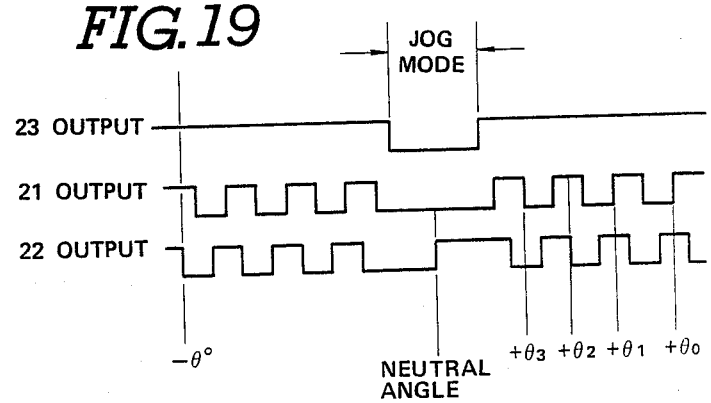
FIG. 19 shows the relationships among outputs of three optical sensors for distinguishing JOG MODE operation from SHUTTLE mode operation.

The dial-encoding microcomputer 8 distinguishes between JOG MODE and SHUTTLE MODE according to the angular position of the rotary disc 221. Outputs of the optical sensors 21, 22 and 23 are related as shown in FIG. 19. As will be appreciated herefrom, JOG MODE is performed within a given angular range of the neutral position of the rotary disc 221. That is to say, while the rotary disc 221 is within an angular range in which the output of the optical sensor 23 remains low, SHUTTLE MODE is disabled. When the shuttle ring 220 is rotated clockwise or counterclockwise out of the given angular range, the output of the optical sensor 23 goes HIGH. At the same time, according to rotation of the rotary disc 221, the optical sensors 21 and 22 outputs pulses with 90° of mutual phase-shift. As shown in FIG. 19, the relationships between the pulses of the optical sensors 21 and 22 determining playback speed in the presence of a HIGH-level output from the optical sensor 23 are represented by the angular positions $\theta_3$, $\theta_2$, $\theta_1$ and $\theta_0$ of FIG. 19. In the shown embodiment, playback speed, the rotary disc angular position and phases of the outputs of the optical sensors 21 and 22 are so arranged as shown in the following table 1:

TABLE

| Angle | $\theta_3$ | $\theta_2$ | $\theta_1$ | $\theta_0$ |
|---|---|---|---|---|
| 21 Output | LOW | HIGH | LOW | HIGH |
| 22 Output | LOW | LOW | HIGH | HIGH |
| Playback Sp. | 1/5 | 1/1 | 2/1 | CUE REV |

JOG MODE
(Step 1020)

As set forth above, when the shuttle ring 220 is not manipulated and thus the rotary disc 221 is in the neutral angle range as shown in FIG. 11, the JOG MODE is performed. In the JOG MODE, the playback speed of the tape is adjusted depending upon the rotation speed of the dial disc 210. As set out with respect to the CLOCK SET MODE, the controlling microcomputer distingushes between clockwise rotation and counter-clockwise rotation of the dial disc 210 depending on the phases of the outputs of the optical sensors 21 and 22. Also, the controlling microcomputer 7 controls playback speed according to rotation of the dial disc 210 according to the following table 2, in which T represents the pulse period of the sensor output such as is shown in FIG. 16:

TABLE 2

| T | T > t1 | t1 > T > t2 | t2 > T > t3 | t3 > T |
|---|---|---|---|---|
| 21 Output | HIGH | LOW | HIGH | LOW |
| 22 Output | HIGH | HIGH | LOW | LOW |
| Playback Sp. | ×2 | ×1 | SLOW | FIELD |

The reference value $t_1$ is shorter than $t_2$ which is shorter than $t_3$. When the dial disc is rotated at a speed higher than a high-speed threshold represented by the reference time $t_1$, and thus the pulse duration of the output of the optical sensor 21 is shorter than the reference time $t_1$, the playback speed will be set to twice the normal playback speed. On the other hand, when frame advance is desired, the dial disc 210 is rotated at a relatively low speed. As a result, the pulse duration T of the optical sensor 21 becomes longer than the reference time $t_3$. Therefore, the controlling microcomputer 7 advances the image on the TV monitor frame-by-frame with each given angle of dial disc rotation.

CHANNEL SET MODE
(Step 1026)

The controlling microcomputer 7 is normally ready for CHANNEL SET MODE unless one or more of the other operation modes described above are ordered and is always ready when the input selector switch 105 is set to the TV tuner position.

In the CHANNEL SET MODE, the channel is selected in substantially the same manner as discussed with respect to TIMER SET MODE. Therefore, it is not necessary to explain the CHANNEL SET MODE operation in detail.

As will be appreciated herefrom, according to the present invention, since the rotary dial assembly can perform various functions, the necessary switches or push-buttons which would otherwise be arranged on the front panel of the VTR deck can be eliminated, which greatly simplifies the console structure. This increases the freedom of design for the switch arrangement. Also, application of this rotary dial assembly will help reduce the size of the VTR deck. Furthermore, since the shown embodiment allows the advance and retard rate of the number to be adjusted, timer set, clock setting, and channel selection can be performed more conventiently. Also, by making the picture search speed adjustable in accordance with the angular velocity or position of the rotary dial or the shuttle ring, manual adjustment of the playback speed is much easier than in the prior art.

While the present invention has been disclosed in detail in terms of the preferred embodiment of the invention in order to facilitate a better understanding of the invention, the invention may be embodied in various ways without departing from the principles of the invention as set out in the appended claims. Therefore, the invention should be understood to include all possible embodiments and modifications of the invention which do not depart from the principles set forth in the appended claims.

What is claimed is:

1. A rotary dial assembly for a video tape recorder system capable of recording and reproducing video signals, performing a picture search, and performing timer activated recording, comprising:
    a dial manually rotatable at a desired speed in opposing first and second directions;
    a first sensing means for monitoring magnitude of angular displacement of said dial and producing a rotation angle indicative signal;
    a timer set mode switch manually operable to produce a timer set mode selector signal ordering said video tape recorder system to operate in a timer set mode; p1 a display for displaying at least symbols representing a time-activated recording start timing and end timing; and
    a controller responsive to said timer set mode selector signal for changing the value represented by each of said symbols to represent a value corresponding to the angular position of said dial, which angular position is derived on the basis of the values of a direction indicative signal and said rotation angle indicative signal.

2. The rotary dial assembly as set forth in claim 1, which further comprises a second sensing means for monitoring the rotation speed of said dial and producing a rotation speed indicative signal, and said controller is responsive to said rotation speed indicative signal to adjust said given rate based thereon.

3. The rotary dial assembly as set forth in claim 1, which further comprises means for triggering a picture search mode and producing a command for entry into the picture search mode, and said controller is responsive to said command to perform forward and reverse playback selectively and at a given speed according to rotation of said dial.

4. The rotary dial assembly as set forth in claim 3, in which said video tape recorder system includes a pause switch for temporarily stopping playback so as to freeze an image on a television monitor, said pause switch serving as said picture search triggering means.

5. The rotary dial assembly as set forth in claim 1, which further comprises means for triggering a picture search mode and producing a command for entry into the picture search mode, a ring rotatable independently of said dial and a fourth sensing means monitoring the angular position of said ring and producing a shuttle mode selector signal when angular displacement of said ring is detected, and said controller is responsive to said shuttle mode selector signal in the presence of said command for selectively performing forward and reverse playback at a variable playback speed varying in accordance with the direction and magnitude of angular displacement of said ring.

6. The rotary dial assembly as set forth in claim 5, wherein said first and second sensing means also cooperate with said ring for monitoring angular displacement of the latter and producing said rotating direction indicative signal and said rotation angle indicative signal.

7. The rotary dial assembly as set forth in claim 6, wherein said controller is also responsive to rotation of said dial in the presence of said command for performing forward and reverse playback selectively at a given speed according to rotation of said dial.

8. The rotary dial assembly as set forth in claim 5, wherein said dial and said ring are associated with a common rotary plate with which said first, second and second sensing means are associated for monitoring the direction, magnitude and speed of angular displacement thereof.

9. The rotary dial as set forth in claim 8, wherein said dial is further associated with a click mechanism providing a detent action at every given angle of angular displacement, which given angle corresponds to one frame of a video signal.

10. The rotary dial assembly as set forth in claim 1, in which said video tape recorder system also has a television tuner for selecting a television channel and in which the selected telvision channel is indicated on said display, further comprising means for triggering a channel set mode for the video tape recorder system for selecting a television channel, and said controller is responsive to rotation of said dial in said channel set mode to adjust the channel selection according to angular displacement of said dial.

11. The rotary dial assembly as set forth in claim 10, which further comprises a second sensing means for monitoring the rotation speed of said dial and producing a rotation speed indicative signal, and said controller is responsive to said rotation speed indicative signal to adjust said given rate in accordance therewith.

12. The rotary dial assembly as set forth in claim 10, wherein said controller adjusts the rate of change of said television channel in said channel set mode depending upon said rotation speed indicative signal value.

13. A rotary dial assembly for a video tape recorder system capable of recording and reproducing video signals, performing a picture search, and performing timer activated recording, comprising:
    a sub-panel associated with a front panel of said video tape recorder system and mounting the rotary dial assembly, said sub-panel being hinged to said front panel for movement between a first position in which said sub-panel is oriented vertically so as to expose one side of said rotary dial assembly for manual operation and a second position in which said sub-panel is oriented horizontally so as to expose the other side of said rotary dial for manual operation;

a dial manually rotatable at a desired speed in opposing first and second directions;

a first sensing means for monitoring magnitude of angular displacement of said dial and producing a rotation angle indicative signal;

a timer set mode switch manually operable to produce a timer set mode selector signal ordering said video tape recorder system to operate in a timer set mode;

a display for displaying at least symbols representing a time-activated recording start timing and end timing; and a controller responsive to said timer set mode selector signal for changing the value represented by each of said symbols at a given rate on said display, said given rate being selected on the bases of the values of a direction indicative signal and said rotation angle indicative signal.

14. The rotary dial assembly as set forth in claim 13, wherein said mode switch is disposed on the portion of said front panel opposing said sub-panel when the latter is in its vertical position, hidden thereby and accessible only when said sub-panel is in said horizontal position.

15. A rotary dial assembly for a video tape recorder system capable of recording and reproducing video signals, performing a picture search, and including a television tuner for varying a television signal, comprising:

a dial manually rotatable at a desired speed in opposing first and second directions;

a first sensing means for monitoring magnitude of angular displacement of said dial and producing a rotation angle indicative signal;

a channel set mode switch manually operable to produce a first mode selector signal ordering said video tape recorder system to operate in a television channel set mode;

a display for displaying at least symbols representing a time-activated recording start timing and end timing; and a controller responsive to said rotation angle indicative signal for performing said picture search for feeding fields of video signals in a forward and a reverse direction according to a rotating direction of said dial, a number of fields to feed depending upon said rotation angle indicative signal value and responsive to said first set mode selector signal for changing the value repesented by each of said symbols at a given rate on said display, said given rate being selected on the basis of the values of a direction indicative signal and said rotation angle indicative signal.

16. The rotary dial assembly as set forth in claim 15, which further comprises a second sensing means for monitoring the rotation speed of said dial and producing a rotation speed indicative signal, and said controller is responsive to said rotation speed indicative signal to adjust said given rate based thereon.

17. The rotary dial assembly as set forth in claim 15, which further comprises means for triggering a picture search mode and producing a command for entry into the picture search mode, and said controller is responsive to said command to perform forward and reverse playback selectively and at a given speed according to rotation of said dial.

18. The rotary dial assembly as set forth in claim 17, in which said video tape recorder system includes a pause switch for temporarily stopping playback so as to freeze an image on a television monitor, said pause switch serving as said picture search triggering means.

19. The rotary dial assembly as set forth in claim 15, which further comprises means for triggering the picture search mode and producing a command for entry into the picture search mode, a ring rotatable independently of said dial and a fourth sensing means monitoring the angular position of said ring and producing a shuttle mode selector signal when angular displacement of said ring is detected, and said controller is responsive to said shuttle mode selector signal in the presence of said command for selectively performing forward and reverse playback at a variable playback speed varying in accordance with the direction and magnitude of angular displacement of said ring.

20. The rotary dial assembly as set forth in claim 19, wherein said first and second sensing means also cooperate with said ring for monitoring angular displacement of the latter and producing said rotating direction indicative signal and said rotation angle indicative signal.

21. The rotary dial assembly as set forth in claim 20, wherein said controller is also responsive to rotation of said dial in the presence of said command for performing forward and reverse playback selectively at a given speed according to rotation of said dial.

22. The rotary dial assembly as set forth in claim 19, wherein said dial and said ring are associated with a common rotary plate with which said first, second and second sensing means are associated for monitoring the direction, magnitude and speed of angular displacement thereof.

23. The rotary dial as set forth in claim 22, wherein said dial is further associated with a click mechanism providing a detent action at every given angle of angular displacement, which given angle corresponds to one frame of a video signal.

24. A rotary dial assembly for a video tape recorder system capable of recording and reproducing video signals, performing a picture search, and including a television tuner for varying a television channel, comprising:

a sub-panel associated with a front panel of said video tape recorder system and mounting the rotary dial assembly, said sub-panel being hinged to said front panel for movement between a first position in which said sub-panel is oriented vertically so as to expose one side of said rotary dial assembly for manual operation and a second position in which said sub-panel is oriented horizontally so as to expose the other side of said rotary dial assembly for manual operation;

a dial manually rotatable at a desired speed in opposing first and second directions;

a first sensing means for monitoring magnitude of angular displacement of said dial and producing a rotation angle indicative signal;

a channel set mode switch manually operable to produce a first mode selection signal ordering said video tape recorder system to operate in a television channel set mode;

a display for displaying at least symbols representing a time-activated recording start timing and end timing; and a controller responsive to said first mode selector signal for changing the value represented by each of said symbols at a given rate on said display, said given rate being selected on the bases of the values of a direction indicative signal and said rotation angle indicative signal.

25. The rotary dial assembly as set forth in claim 24, wherein said first mode selector switch is disposed on the portion of said front panel opposing said sub-panel when the latter is in its vertical position, hidden thereby and accessible only when said sub-panel is in said horizontal position.

26. A video tape recorder system comprising:
a signal processing system for processing video tape recorder signals for recording and reproducing, which signal processing system is associated with a timer for time-activated recording;
said timer being actuatable to select a recording start timing, recording end timing and a television channel to be recorded; and
a manually recordable rotary dial system associated with said timer to allow selection of said recording start timing, recording end timing and television channel by rotation thereof, said rotary dial system being rotatable for varying values to be set as said recording start timing, said recording end timing and television channel according to rotational magnitude thereof.

27. The video tape recorder system as set forth in claim 26, wherein said signal processing system also allows picture in a playback-pause search state for locating a desired image frame, and advances said image frame forward and reverse at a given speed according to rotation of said rotary dial system.

28. The video tape recorder system as set forth in claim 27, which further comprises a ring associated with said signal processing system and rotatingly operable to perform the picture search at a predetermined variable speed according to the direction and magnitude of its rotation.

29. The video tape recorder system as set forth in claim 28, wherein said ring is connected to said manually operable rotary dial system to form an assembly and is operable independently of said manually operable rotary dial system.

30. The video tape recorder as set forth in claim 29, wherein said assembly is mounted on a sub-panel hinged to a front panel of said video tape recorder system, said sub-panel having two surfaces at which at least said rotary dial is accessible.

31. The video tape recorder system as set forth in claim 26, wherein said rotary dial system comprises:
a dial manually rotatable at a desired speed in opposing first and second directions;
a first sensing means for monitoring the direction of rotation of said dial and producing a direction indicative signal;
a second sensing means for monitoring magnitude of angular displacement of said dial and producing a rotation angle indicative signal;
a timer set mode switch manually operable to produce a first mode selector signal ordering said video tape recorder system to operate in a timer set mode;

a display for displaying at least symbols representing a timer-activated recording start timing and end timing; and
a controller responsive to said first mode selector signal for changing the value represented by each of said symbols at a given rate on said display, said given rate being selected on the basis of the values of said direction indicative signal and said rotating angle indicative signal.

32. The video tape recorder system as set forth in claim 31, which further comprises a third sensing means for monitoring the rotation speed of said dial and producing a rotation speed indicative signal, and said controller is responsive to said rotation speed indicative signal to adjust siad given rate based thereon.

33. The video tape recorder system as set forth in claim 31, which further comprises means for triggering a picture search mode and producing a command for entry into the picture search mode, and said controller is responsive to said command to perform forward and reverse playback selectively and at a given speed according to rotation of said dial.

34. The video tape recorder system as set forth in claim 33, in which said video tape recorder system includes a pause switch for temporarily stopping playback so as to freeze an image on a television monitor, said pause switch serving as said picture search triggering means.

35. The video tape recorder system as set forth in claim 33, wherein said rotary dial assembly is mounted on a sub-panel associated with a front panel of said video tape recorder system, said sub-panel being hinged to said front panel for movement between a first position in which said sub-panel is oriented vertically so as to exposes one side of said rotary dial assembly for manual operation and a second position in which said sub-panel is oriented horizontally so as to expose the other side of said rotary dial for manual operation.

36. The video tape recorder system as set forth in claim 35, wherein said first mode selector switch is disposed on the portion of said front panel opposing said sub-panel when the latter is in its vertical position, hidden thereby and accessible only when said sub-panel is in said horizontal position.

37. The video tape recorder system as set forth in claim 31, which further comprises means for triggering a picture search mode and producing a command for entry into the picture search mode, a ring rotatable independently of said dial and a fourth sensing means monitoring the angular position of said ring and producing a shuttle mode selector signal when angular displacement of said ring is detected, and said controller is responsive to said shuttle mode selector signal in the presence of said command for selectively performing forward and reverse playback at a variable playback speed varying in accordance with the direction and magnitude of angular displacement of said ring.

38. The video tape recorder system as set forth in claim 37, wherein said second and first sensing means also cooperate with said ring for monitoring angular displacement of the latter and producing said rotating direction indicative signal and said rotation angle indicative signal.

39. The video tape recorder system as set forth in claim 38, wherein said controller is also responsive to rotation of said dial in the presence of said command for performing forward and reverse playback selectively at a given speed according to rotation of said dial.

40. The video tape recorder system as set forth in claim 37, wherein said dial and said ring are associated with a common rotary plate with which said first, second and third sensing means are associated for monitoring the direction, magnitude and speed of angular displacement thereof.

41. The video tape recorder system as set forth in claim 40, wherein said dial is further associated with a click mechanism providing a detent action at every given angle of angular diaplacement, which given angle corresponds to one frame of a video signal.

42. A video tape recorder system comprising:
a signal processing system for processing video tape recorder signals for recording and reproducing, which signal processing system is associated with a timer for time-activated recording;
a television tuner for selecting a television channel and in which the selected television channel is indicated on a display;
means for triggering a channel set mode for the video tape recorder system for selecting a television channel;
said timer being actuable to select a recording start timing, recording end timing and a television channel to be recorded; and
a manually rotatable rotary dial system associated with said timer to allow selection of said rotation start timing, recording end timing and television channel by rotation thereof.

43. The video tape recorder system as set forth in claim 42, which further comprises a second sensing means for monitoring the rotation speed of said dial and producing a rotation speed indicative signal, and said controller is responsive to said rotation speed indicative signal to adjust said given rate in accordance therewith.

44. The video tape recorder system as set forth in claim 42, wherein said controller adjusts the rate of change of said television channel in said channel set mode depending upon said rotation speed indicative signal value.

45. In a video tape recorder system with a rotary dial input device, a method of inputting information from a user to the video tape recorder system comprising the steps of:
manually rotating said rotary dial at a rate to an extent and/or in a direction indicative of the desired information;
monitoring rotation of said rotary dial; and
converting the direction, speed and/or extent of rotation of said rotary dial into an information form readily employable by said video tape recorder system for performing at least two of a picture search by feeding fields of video signals depending upon the direction and/or extent of rotation of said dial and at the speed depending upon the rotation speed of said dial; a timer set for setting time-activated video recording operation start timing, recording operation end timing and channel to be recorded; and channel selection.

46. A video tape recorder system comprising:
a signal processing system for processing video tape recorder signals for recording and reproducing, which signal processing system is associated with a timer for time-activated recording;
a television tuner for selecting a television channel and in which the selected television channel is indicated on a display;
means for triggering a channel set mode for the video tape recorder system for selecting a television channel;
a manually recordable rotary dial system associated with said timer to allow selection of said recording start timing, recording end timing, and television channel by rotation thereof, said rotary dial system comprising:
a dial manually rotatable at a desired speed in opposing first and second directions;
a first sensing means for monitoring magnitude of angular displacement of said dial and producing a rotation angle indicative signal;
a timer set mode switch manually operable to produce a timer set mode selector signal ordering said video tape recorder system to operate in a timer set mode;
said display for displaying at least symbols representing a time-activated recording start timing and end timing; and
a controller responsive to said timer set mode selector signal for changing the value represented by each of said symbols at a given rate on said display, said given rate being selected on the basis of the values of said direction indicative signal and said rotating angle indicative signal, and said controller is responsive to rotation of said dial in said channel set mode to adjust the channel selection according to angular displacement of said dial.

47. A rotary dial assembly for a video tape recorder system capable of recording and reproducing video signals, performing a picture search, and performing timer activated recording, comprising:
a dial manually rotatable at a desired speed in opposing first and second directions;
a first sensing means for monitoring magnitude of angular displacement of said dial and producing a rotation angle indicative signal;
a timer set mode switch manually operable to produce a timer set mode selector signal ordering said video tape recorder system to operate in a timer set mode;
a display for displaying at least symbols representing a time-activated recording start timing and end timing; and
a controller responsive to said rotation angle indicative signal for performing the picture search for feeding fields of video signals in a forward and a reverse direction according to a rotating direction of said dial, a number of fields to feed depending upon said rotation angle indicative signal value and responsive to said timer set mode selector signal for changing the value represented by each of said symbols at a given rate on said display, said given rate being selected on the basis of the values of a dial rotation direction indicative signal and said rotation angle indicative signal.

48. A video tape recorder having a timer activated recording function comprising:
a dial manually rotatable in opposing directions;
sensing means for sensing the rotation of said dial;
selecting means for selecting set modes of said time-activated recording function, said set modes comprising at least a record-starting set mode and a record-ending set mode;
a controller responsive to said selecting means for changing the contents of each of said set modes according to an output from said sensing means.

49. A video tape recorder as set forth in claim 48, wherein said sensing means includes first sensing means for sensing the magnitude and direction of rotation of said dial, and controller changing the content of each of said set modes according to the magnitude and direction of rotation of said dial sensed by said first sensing means.

50. A video tape recorder as set forth in claim 49, comprising wherein said sensing means further comprises second sensing means for sensing the speed of rotation of said dial, whereby the changing rate of said contents to the change of magnitude of rotation of said dial is changed according to said speed of rotation of said dial as sensed by said second sensing means.

51. A video tape recorder as set forth in claim 48, wherein said set mode further comprises a TV channel selection mode.

52. A video tape recorder as set forth in claim 48, further including a picture search function, said video tape recorder further comprising:
 a second controller for performing said picture search function at a given tape speed according to the rotation of said dial.

53. A video tape recorder as set forth in claim 48, further comprising:
 a sub-panel for mounting said dial thereon;
 wherein said sub-panel is hinged to a front panel of said video tape recorder for movement between a first position in which said sub-panel is positioned vertically so as to expose one side of said dial and a second position in which said sub-panel is positioned horizontally so as to expose the other side of said dial.

54. A video tape recorder having a picture search function comprising:
 a dial manually rotatable in two directions;
 a ring rotatable in opposite two directions manually and independently of said dial;
 first sensing means for sensing the rotation of said dial;
 second sensing means for sensing the rotation of said ring;
 mode selecting means responsive to said second sensing means for selecting a jog mode or a shuttle mode, said jog mode being selected when the position of said ring is within a predetermined range from a neutral position and instead said shuttle mode is selected when the position of said ring is out of said predetermined range;
 a controller responsive to said mode selecting means for controlling tape speed in said picture search function according to said first or second sensing means, whereby said tape speed is controlled according to said first sensing means in said jog mode while the same is controlled according to said second sensing means in said shuttle mode.

* * * * *